United States Patent [19]

Nied

[11] Patent Number: 4,818,460
[45] Date of Patent: Apr. 4, 1989

[54] ROLLER FORMING OF THERMOPLASTIC SHEET MATERIAL

[75] Inventor: Herman F. Nied, Clifton Park, N.Y.

[73] Assignee: General Electric Company, Schenectady, N.Y.

[21] Appl. No.: 87,053

[22] Filed: Aug. 18, 1987

Related U.S. Application Data

[63] Continuation of Ser. No. 843,343, Mar. 24, 1986, abandoned.

[51] Int. Cl.⁴ .............................................. B29C 51/00
[52] U.S. Cl. .................................... 264/310; 264/313; 264/320; 264/DIG. 68; 425/374; 425/458; 425/DIG. 48
[58] Field of Search ............... 264/310, 320, 322, 292, 264/339, 313, DIG. 68; 156/196; 425/363, 374, 458, DIG. 48

[56] References Cited

U.S. PATENT DOCUMENTS

| 2,420,119 | 5/1947 | Boehm et al. | 425/394 |
| 2,897,546 | 8/1959 | Clapp et al. | 264/339 |
| 4,302,417 | 11/1981 | Michelotti | 264/339 |

FOREIGN PATENT DOCUMENTS 49209  5/1981  Japan .................................. 264/339

Primary Examiner—James Lowe
Attorney, Agent, or Firm—William H. Steinberg; James C. Davis, Jr.; Paul R. Webb, II

[57] ABSTRACT

A method of roller forming thermoplastic sheet material to form large parts includes providing a form having a surface of predetermined curvature. A sheet of thermoplastic material is overlain on the form surface and heated until pliable. Pressure is provided on the thermoplastic sheet using a roller so that the sheet conforms to the shape of the form.

13 Claims, 2 Drawing Sheets

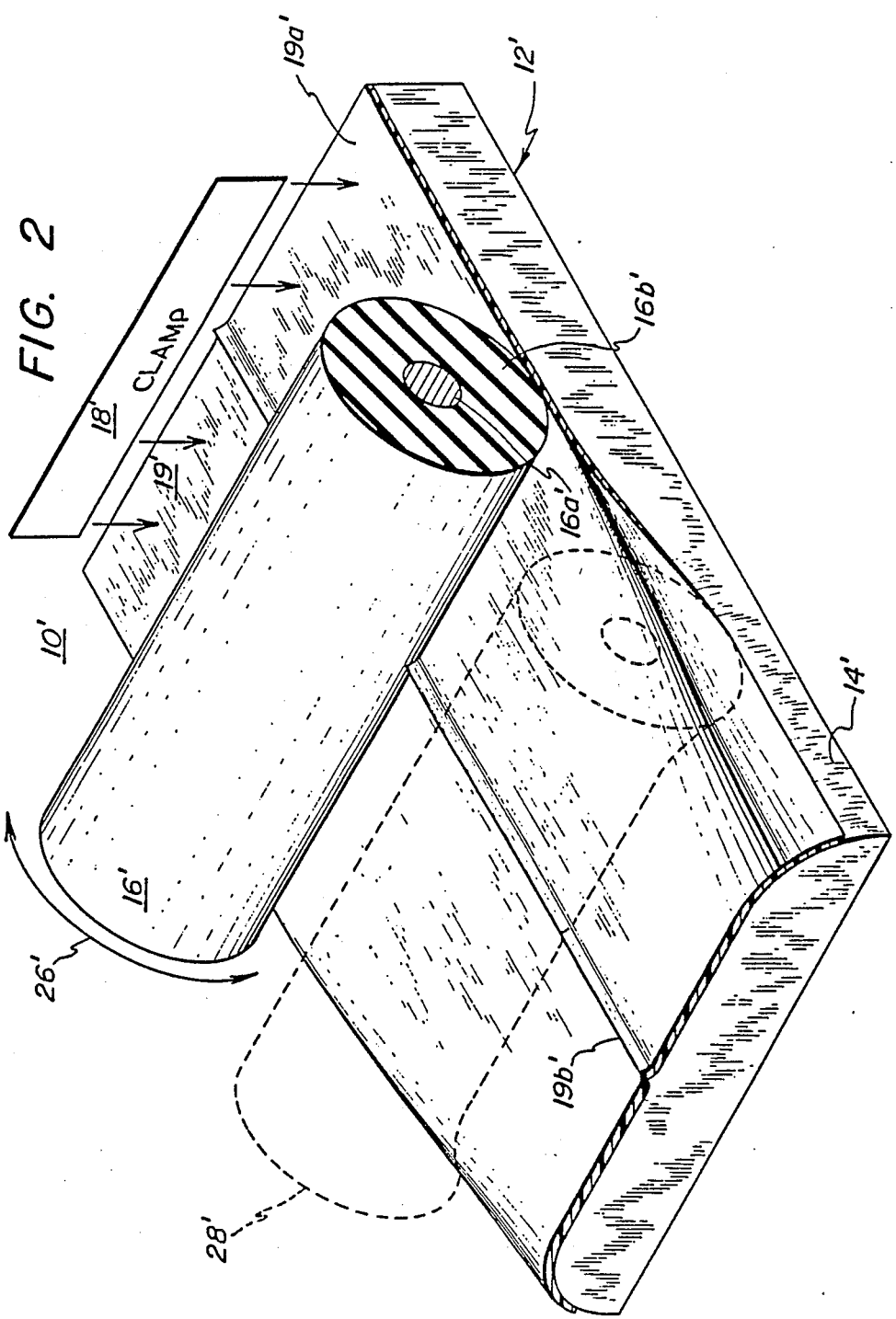

和4,818,460

ROLLER FORMING OF THERMOPLASTIC SHEET MATERIAL

This application is a continuation, of application Ser. No. 843,343, filed 3/24/86, now abandoned.

BACKGROUND OF THE INVENTION

This invention relates generally to a method of forming plastics and more specifically to a method of roller forming thermoplastics.

Thermoplastics have recently become available which exhibit desirable engineering characteristics heretofore unavailable in other types of plastics. Such thermoplastics, typically referred to as engineering thermoplastics, can be selected to provide high strength, impact resistance, toughness and high temperature and load bearing capabilities. These characteristics make the use of such thermoplastics particularly desirable in applications currently employing less desirable commodity plastics, or sheet metals. Such applications include, for example, large automobile body parts such as hoods, fenders and door panels.

Presently, two general types of processes are used to form thermoplastics into large parts: injection molding and sheet stamping. Each of these processes has substantial disadvantages, particularly with respect to the forming of large thin parts. Injection molding processes for thermoplastics are typically limited to parts of less than 600 square inches in surface area. This limitation is imposed by enormous clamp down forces which must be applied to mold dies to counteract large forces generated by high injection pressures acting on large part areas.

Sheet stamping processes are limited in their application to thermoplastics by the current lack of knowledge regarding large deformation behavior of the thermoplastics. This lack of knowledge regarding the large deformation behavior of thermoplastics makes it difficult to consistently produce large, high quality thermoplastic parts using currently available sheet stamping processes. Thus, such sheet stamping processes are currently limited to thermoplastic parts substantially smaller in size, for example, than those required to manufacture automobile body panels.

It would thus be desirable to provide a method for forming thermoplastic parts which reliably produces high quality parts, and which can be economically implemented using readily available technology. Such a method would be particularly useful in forming large parts from engineering thermoplastics.

OBJECTS OF THE INVENTION

Accordingly, a principal object of the present invention is to provide a method of roller forming thermoplastic parts which is readily applicable to parts of large surface area.

Another object of the present invention is to provide a method of roller forming thermoplastic parts which consistently produces high quality large parts.

A further object of the present invention is to provide a method of roller forming thermoplastic parts which can be economically implemented using currently available technology.

SUMMARY OF THE INVENTION

The method of the present invention is implemented by providing a form having a surface of predetermined curvature. A sheet of thermoplastic material is provided and overlain on the curved surface of the form. The thermoplastic sheet is heated until pliable, and pressure is provided on the sheet using a roller so that the sheet conforms to the shape of the form. In some applications it may be desirable to clamp the thermoplastic sheet to the form to prevent slippage of the sheet on the form. In applications where the form surface has simple curvature the roller can comprise a rigid material such as metal. Where an application requires a form surface having a more complex curvature it may be desirable to use a pliable roller which can deform to aid in conforming the thermoplastic sheet to the shape of the form, or a specially shaped roller adapted to conform to unusual shapes.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing Figures, in which:

FIG. 2 illustrates a perspective view of an alternate apparatus for performing the method of the present invention.

DETAILED DESCRIPTION OF THE PREFERRED EMBODIMENT

Figure 1:
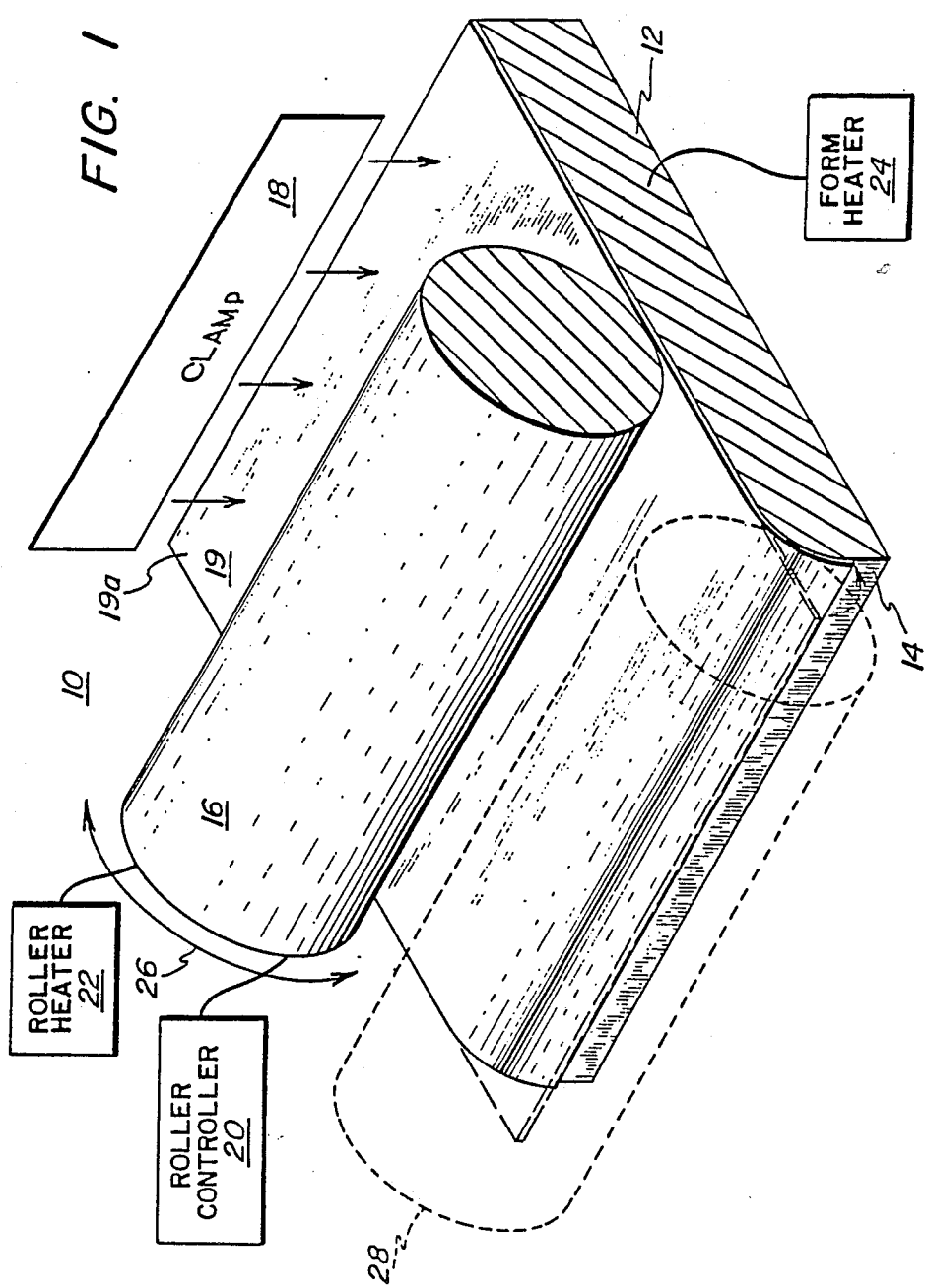
FIG. 1 illustrates a perspective view of one apparatus for performing the method of the present invention.

Referring now to FIG. 1, a forming assembly 10 is shown for performing the method of the present invention. Forming assembly 10 includes a metal form or platen 12 having a surface 14 of predetermined curvature, a metal roller 16 and an optional, schematically illustrated clamp 18. Clamp 18 comprises, for example, one of many mechanical clamps or clamp assemblies well known to those skilled in the art. Form 12 and roller 16 comprise, for example, steel, with form surface 14 and roller 16 each having an optional non-stick coating or surface. Such a coating or surface could comprise, for example, a plating such as TEFLON (TEFLON is a registered trademark of DuPont Corporation), a sprayed on lubricant or mold release agent, or simply a highly polished finish. A sheet of thermoplastic material 19, shown in partial dashed line in an unformed, preferably flat initial state and for example comprising an engineering thermoplastic of the type referred to hereinabove, is shown overlying form surface 14 and clamped thereto by clamp 18.

Forming assembly 10 further includes, shown in schematic representation, a roller controller 20, a roller heater 22, and a form heater 24. Roller controller 20 functions to control the motion of roller 20, including the pressure exerted by the roller onto thermoplastic sheet 19, and comprises for example one of many mechanical assemblies readily known to those skilled in the art. Roller and form heaters 22 and 24, respectively, function to provide heat to thermoplastic sheet 19, and comprise for example electrical resistive heaters, radiant heaters, or other types of heaters well known to those skilled in the art.

To perform the method of the present invention, form 12 is provided having surface 14 formed to the predetermined curvature of the desired, finished thermoplastic part. Generally flat thermoplastic sheet 19 (shown in part in dashed line in FIG. 1) is overlain on form surface 14, and clamped at a first end 19a to form 12 with clamp 18. Thermoplastic sheet 19 is heated until it is soft and pliable, and pressure is applied to the thermoplastic sheet using roller 16 to conform the sheet to the shape of surface 14 (conformed sheet 19 being shown in solid line in FIG. 1). This pressure is applied in either a single, rolling pass of roller 16, or alternatively by a repetitive, reciprocal rolling motion of the roller. In either case, when thermoplastic sheet 19 is clamped to form 12, roller 16 is rolled in a direction generally perpendicular to thermoplastic sheet end 19a. The rolling motion of roller 16 is indicated by arrow 26, and the roller is shown in phantom at 28 proximate the free end of thermoplastic sheet 19.

In performing the method of the present invention, thermoplastic sheet 19 is heated using roller heater 22 or form heater 24 or a combination of the two. Thermoplastic sheet 19 can also be optionally preheated before being placed on form 12. The optional non-stick coating on roller 16 and/or form surface 14 functions to aid in preventing thermoplastic sheet 19 from sticking to the form or the roller, and is selected depending on the types of materials and process parameters selected. Clamp 18 is designated as optional because, depending on the materials selected for form surface 14 and thermoplastic sheet 19 and the various process parameters such as temperature, there may be sufficient friction between the thermoplastic sheet and the form to obviate the need for clamping the two together. It will be understood that, while roller 16 is shown as being coextensive with thermoplastic sheet 19, the roller may be smaller than the thermoplastic sheet and be moved by controller 20 to adequately roll the entirety of the thermoplastic sheet.

An exemplary list of thermoplastics which can be formed using the method of the present invention includes, but is not limited to, the following: polycarbonates; ABS plastics based on combining acrylonitrile, butadiene and styrene; acetal homopolymers; acetal copolymers; acrylic resins, epoxy resins; polyamides; phenolic resins; phenylene oxide based resins such as polyphenylene oxide and blends of polyphenylene oxides and styrene resins; polyaryl ether resins; polyester resins including poly(alkylene terephthalate) resins; polyethylene resins; polyphenylene sulfide resins; polypropylene resins; polysulfone resins; polyurethane resins; silicone resins; ethylene resins such as ethylenevinyl acetate; and polyimides including polyetherimide resins. Persons skilled in the art will be able to recognize the inclusion of both engineering and commodity thermoplastics in the above list, and will be able to identify further thermoplastics which can be formed according to the method taught herein.

Referring now to FIG. 2, a forming assembly 10' is shown wherein like features to those of forming assembly 10 (FIG. 1) are indicated by like, primed reference numerals. For purposes of clarity, the form and roller heaters, and the roller controller have been omitted from FIG. 2.

Forming assembly 10' is substantially identical to forming assembly 10 with the exception of the shape of form surface 14' and the construction of roller 16'. As is apparent from a consideration of FIGS. 1 and 2, form surface 14' is of a substantially more intricate shape than form surface 14, the former including curvature in two directions; i.e., downward and away (as viewed in FIG. 2) from a center line 19b'. Roller 16' is constructed to be pliable, and includes a substantially rigid core 16a', comprised for example of metal, and a pliable outer cover 16b', comprised for example of rubber. It will be appreciated by those skilled in the art that roller 16' can be comprised entirely of a flexible material. It will be further appreciated that while rollers 16 and 16' have each been shown as generally cylindrical in shape, the shape of either roller can be adapted to more closely conform to intricate or sharp curvatures in the forms.

Forming assembly 10' is used to perform the method of the present invention in substantially the same manner as described hereinabove with respect to FIG. 1. In forming assembly 10', outer cover 16b' of roller 16' deforms as the roller is moved across thermoplastic sheet 19', thereby causing the thermoplastic sheet to conform to the intricate curvature of form surface 14'. Roller 16' is shown in phantom at 28' with the pliable outer surface thereof deformed to the shape of form surface 14'.

In tests performed using small, representative sheets of LEXAN polycarbonate resin, NORYL polyphenylene oxide and styrene resin blend, and glass-reinforced VALOX poly(alkylene terephthalate) resin of various thicknesses and heated to various temperatures, uniformly high quality parts were produced. (LEXAN, NORYL and VALOX are registered trademarks of General Electric Company). These parts exhibited high quality finishes which were apparently limited only by the quality of the form surfaces, and were of uniform thickness and strength. These results are particularly advantageous in the forming of the glass-reinforced VALOX resin, because the addition of the glass reinforcement makes most thermoplastics too high in viscosity to form using the sheet stamping and injection molding processes described hereinabove. It is theorized that these good results were obtained, at least in part, because the inventive method taught herein conforms a thermoplastic sheet to the shape of a form by bending, and not by apparently destructive stretching as is inherent in sheet stamping processes of the type discussed hereinabove. It is expected that these experimental results will extend to the forming of thermoplastic sheet parts of virtually any size because the inventive method taught herein includes none of the limitations inherent in the prior art processes; i.e., the tremendous forces required for injection molding or the stretching and subsequent tearing inherent in sheet stamping.

There is thus provided a method of roller forming thermoplastic sheet materials which provides the advantage of inexpensively and reliably forming high quality large thermoplastic parts. Two forming assemblies for performing the method of the present invention are shown herein, each featuring relatively inexpensive, commercially available components.

While a preferred embodiment of the invention has been illustrated and described, it will be clear that the invention is not so limited. Numerous modifications, changes, variations, substitutions and equivalents will occur to those skilled in the art without departing from the spirit and scope of the present invention. Accordingly, it is intended that the invention herein be limited only by the scope of the appended claims.

What is claimed is:

1. A method of forming thermoplastic contoured parts, comprising the steps of:
   providing a form including a surface of predetermined curvature which varies in height along both the length and width of the form;
   providing a sheet of thermoplastic material;

overlying the surface of said form with the thermoplastic sheet;

heating the entire thermoplastic sheet; and providing pressure on said thermoplastic sheet using a pliable roller so that said thermoplastic sheet conforms to take the shape of the form.

2. A method in accordance with claim 1 wherein said thermoplastic sheet is substantially flat.

3. A method in accordance with claim 1 and further including the step of clamping said thermoplastic sheet to said form for preventing said thermoplastic sheet from slipping on said form.

4. A method in accordance with claim 3 wherein:

said step of clamping is performed by clamping a first end of said thermoplastic sheet to said form; and said step of providing pressure is performed by rolling said roller in a direction generally perpendicular to said first end of said thermoplastic sheet.

5. A method in accordance with claim 1 wherein said roller comprises:

a substantially rigid core; and a pliable cover disposed over said core.

6. A method in accordance with claim 1 wherein said step of providing heat to said thermoplastic sheet is performed by heating said form.

7. A method in accordance with claim 1 wherein said step of providing heat to said thermoplastic sheet is performed by preheating said thermoplastic sheet before it is overlain on said form.

8. A method in accordance with claim 1 wherein said thermoplastic sheet comprises an engineering thermoplastic.

9. A method in accordance with claim 8 wherein said engineering thermoplastic comprises a polycarbonate, a phenylene oxide based resin, a polyester resin or a polyetherimide resin.

10. A method of forming thermoplastic parts comprising the steps of:

providing a metal form including a surface of predetermined curvature which varies in height along both the length and width of the form;

providing a substantially flat sheet of thermoplastic material having predetermined size and shape approximately equal to that of the form surface;

overlying said surface of said metal form with said thermoplastic sheet;

clamping a first end of said thermoplastic sheet to said metal form for preventing slippage therefrom;

heating the entire thermoplastic sheet; and providing pressure on said thermoplastic sheet using a pliable roller moved in a direction substantially perpendicular to said sheet first end so that said sheet conforms to the form surface.

11. A method in accordance with claim 10 wherein said roller comprises:

a metal core; and a pliable rubber cover disposed about said metal core.

12. A method in accordance with claim 10 wherein said thermoplastic sheet comprises an engineering thermoplastic.

13. A method in accordance with claim 12 wherein said engineering thermoplastic comprises a polycarbonate, a phenylene oxide based resin, a polyester resin or a polyetherimide resin.

* * * * *